United States Patent Office 3,338,715
Patented Aug. 29, 1967

3,338,715
AZYRIDINYL GELATIN
Donald M. Burness, Rochester, N.Y., assignor to Eastman Kodak Company, Rochester, N.Y., a corporation of New Jersey
No Drawing. Filed June 4, 1963, Ser. No. 285,246
4 Claims. (Cl. 96—111)

This invention relates to the hardening of gelatin to enhance its resistance to water by incorporating therein certain aziridine type compounds.

In the use of gelatin for photographic purposes the gelatin is often treated with a succession of aqueous baths which vary in pH or which have raised temperatures. There has been a great deal of work done on the treatment of gelatin to improve its resistance to water so that swelling or melting of the gelatin does not occur upon treatment thereof with aqueous solutions in processing operations or in hot drying.

Various materials have been suggested as hardeners but in many instances compounds having gelatin hardening characteristics also exhibit unwanted photographic effects of one kind or another. For instance, some aldehyde type hardeners have shown a tendency to cause an increase in fogging of the emulsion. Other types of hardeners have a tendency to cause loss of speed of the emulsion upon storage. It is desirable that hardeners for gelatin particularly when used in photographic emulsions will not adversely affect the photographic characteristics of the emulsion. This also extends to photographic gelatin layers which often contact the photographic emulsion layers in use.

One object of my invention is to provide hardeners for gelatin which do not exhibit detrimental photographic effects. Another object of my invention is to provide materials which when mixed with gelatin will render the latter resistant to the effects of water at varying pH or at elevated temperatures. A further object of my invention is to provide a hardener for carboxyl containing polymers generally, the hardening effect of which may be delayed until the proper treatment has been given. A still further object of my invention is to provide hardeners for photographic layers which instead of causing fogging may even exert an antifoggant effect in certain instances. Other objects of my invention will appear herein.

I have found that gelatin is rendered resistant to the effects of water even at elevated temperatures by incorporating therein a compound having the formula

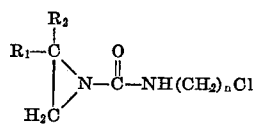

wherein $R_1$ and $R_2$ are hydrogen or lower alkyl and $n$ equals 2 or 3. These compounds are conveniently prepared by reacting the appropriate chloroisocyanate with an aziridine base. These compounds not only exert a hardening action on gelatin but are useful for hardening carboxyl containing polymers generally, the hardening action in those cases often being delayed until a suitable diamine is supplied thereto. The diamine in those cases might be supplied by including gelatin in the compositions.

These hardeners may be incorporated in gelatin or other material to be hardened in any effective amount such as 0.1% or more of the gelatin although in practice it is usually desirable to use at least 0.5% of the hardener based on the weight of the gelatin or other material to be hardened.

The following examples illustrate the making of compounds in accordance with my invention:

Example 1

There was added slowly with cooling to a solution of 10.5 grams of 2-chloroethyl isocyanate in 25 ml. of dry benzene at 10° C., a benezene solution containing 4.3 grams of ethylenimine. After one hour the benzene was evaporated off and ligroin (B.P. 65–75°) was added. There was obtained a colorless, crystalline solid which after recrystallization from ether melted at 37.5–38.5°. The compound thus obtained was N-(2-chloroethylcarbamoyl) aziridine.

Example 2

A procedure similar to that described in the preceding example was repeated except that 6 grams of propylenimine rather than the ethylenimine was employed. An oil was thereby obtained which was induced to crystallize at −80° C. Recrystallization from ether-ligroin gave 11.5 grams of colorless crystals having a melting point of 25.5–27° C. The compound thus obtained was N-(2-chloroethylcarbamoyl)-2-methylaziridine.

The compound as prepared in the preceding examples were added to separate portions of high-speed bromoiodide emulsions in the proportions designated in the following table and were compared with controls. Each emulsion sample was coated onto a cellulose acetate film support at a coverage of 432 mg. of silver and 980 mg. of gelatin per square foot. A sample of each film coating was exposed on an Eastman 1B sensitometer, processed for five minutes in Kodak DK-50 developer, fixed, washed and dried. The results obtained were as follows:

| Hardener used | Conc., g./100 g. of gel | Rel. Speed | Gamma | Fog | Percent swell in water* |
|---|---|---|---|---|---|
| Control | | 100 | 1.25 | 0.09 | 755 |
| Example 1 product | 1 | 102 | 1.22 | .09 | 272 |
| Do | 5 | 105 | 1.22 | .09 | 140 |
| Do | 10 | 100 | 1.10 | .07 | 104 |
| Control | | 100 | 1.29 | .14 | 645 |
| Example 2 product | 3 | 97 | 1.18 | .11 | 419 |
| Do | 6 | 100 | 1.20 | .10 | 360 |

*Vertical swell in water without processing.

It will be noted that in the case of each of the samples the fog was no worse and in some cases even better than that of the corresponding samples which had not been supplied with a hardener, showing the antifogging tendency of these hardeners.

It has been recognized that photographic emulsions containing hardeners may also contain various other additives. For instance, such emulsion may be sulfur sensitized, gold sensitized or chemically sensitized with both gold and sulfur compounds. Such emulsions also admit of optical sensitization with cyanine dyes if desired. Recognition of the various additives which may be added to photographic emulsions containing hardener is illustrated by the disclosure of columns 6, 7 and 8 of U.S. Patent No. 3,062,652 of Jeffreys, Tabor and Burness any of which additives may find employment in the emulsions described and claimed herein.

I claim:
1. Gelatin containing a hardening amount of a compound having the structure

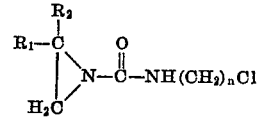

wherein $R_1$ and $R_2$ are substituents selected from the group consisting of hydrogen and alkyl of 1 to 4 carbon atoms and $n$ equals 2–3.

2. A gelatin-silver halide photographic emulsion containing a hardening amount of a compound having the structure

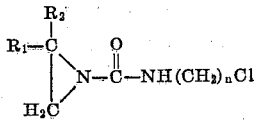

wherein $R_1$ and $R_2$ are substituents selected from the group consisting of hydrogen and alkyl of 1–4 carbon atoms and $n$ is an integer of 2–3.

3. Gelatin containing a hardening amount of N-(2-chloroethylcarbamoyl)aziridine.

4. Gelatin containing a hardening amount of N-(2-chloroethylcarbamoyl)-2-methylaziridine.

References Cited

UNITED STATES PATENTS

| | | | |
|---|---|---|---|
| 2,830,045 | 4/1958 | Leumann et al. | 260—239 |
| 2,931,804 | 4/1960 | Sprivock | 260—239 |
| 2,950,197 | 8/1960 | Allen et al. | 96—111 |
| 2,992,109 | 7/1961 | Allen | 96—111 |
| 2,994,611 | 8/1961 | Heyna et al. | 96—111 |
| 3,250,674 | 5/1966 | Baker | 260—239 |

NORMAN G. TORCHIN, *Primary Examiner.*

A. E. TANENHOLTZ, J. H. RAUBITSCHEK,
*Assistant Examiners.*